(12) United States Patent
Strickland

(10) Patent No.: US 6,882,710 B2
(45) Date of Patent: Apr. 19, 2005

(54) TELEPHONE AND SYSTEM FOR DIRECT DELIVERY OF INFORMATION

(76) Inventor: George G. Strickland, 6423 Babour Lake Rd., Fayetteville, NC (US) 28302

(*) Notice: Subject to any disclaimer, the term of this patent is extended or adjusted under 35 U.S.C. 154(b) by 0 days.

(21) Appl. No.: 09/985,552

(22) Filed: Nov. 5, 2001

(65) Prior Publication Data

US 2002/0027978 A1 Mar. 7, 2002

Related U.S. Application Data

(63) Continuation-in-part of application No. PCT/US00/06701, filed on May 5, 2000.
(60) Provisional application No. 60/132,570, filed on May 5, 1999.

(51) Int. Cl.[7] .................................................. H04M 11/00
(52) U.S. Cl. .............................. 379/93.25; 379/93.17; 379/93.12; 379/93.08
(58) Field of Search ........................ 379/93.01, 93.02, 379/93.08–93.18, 93.24–93.29, 111.01, 90.01, 88.13, 114.02, 908, 111; 370/395.3

(56) References Cited

U.S. PATENT DOCUMENTS

| | | | | |
|---|---|---|---|---|
| 5,416,831 A | * | 5/1995 | Chewning, III et al. | 379/93.25 |
| 5,521,966 A | * | 5/1996 | Friedes et al. | 379/93.02 |
| 5,812,647 A | * | 9/1998 | Beaumont et al. | 379/111 |
| 5,878,122 A | * | 3/1999 | White et al. | 379/114.02 |
| 5,991,301 A | * | 11/1999 | Christie | 370/395.3 |
| 6,154,528 A | * | 11/2000 | Bennett, III et al. | 379/93.25 |
| 6,222,911 B1 | * | 4/2001 | Wyllie, III | 379/114.02 |

* cited by examiner

Primary Examiner—Wing F. Chan
(74) Attorney, Agent, or Firm—Clark & Brody

(57) ABSTRACT

A telephone system includes a data distributor between the outputs of a public exchange switch and customer lines. The data distributor provides a controllable, simultaneous and direct connection between a source of data and a plurality of the customers' telephones to facilitate direct delivery of data to a large number of customers. Telephones for use with the system provide processors for receiving and displaying data and for transmitting responses by the customers.

11 Claims, 1 Drawing Sheet

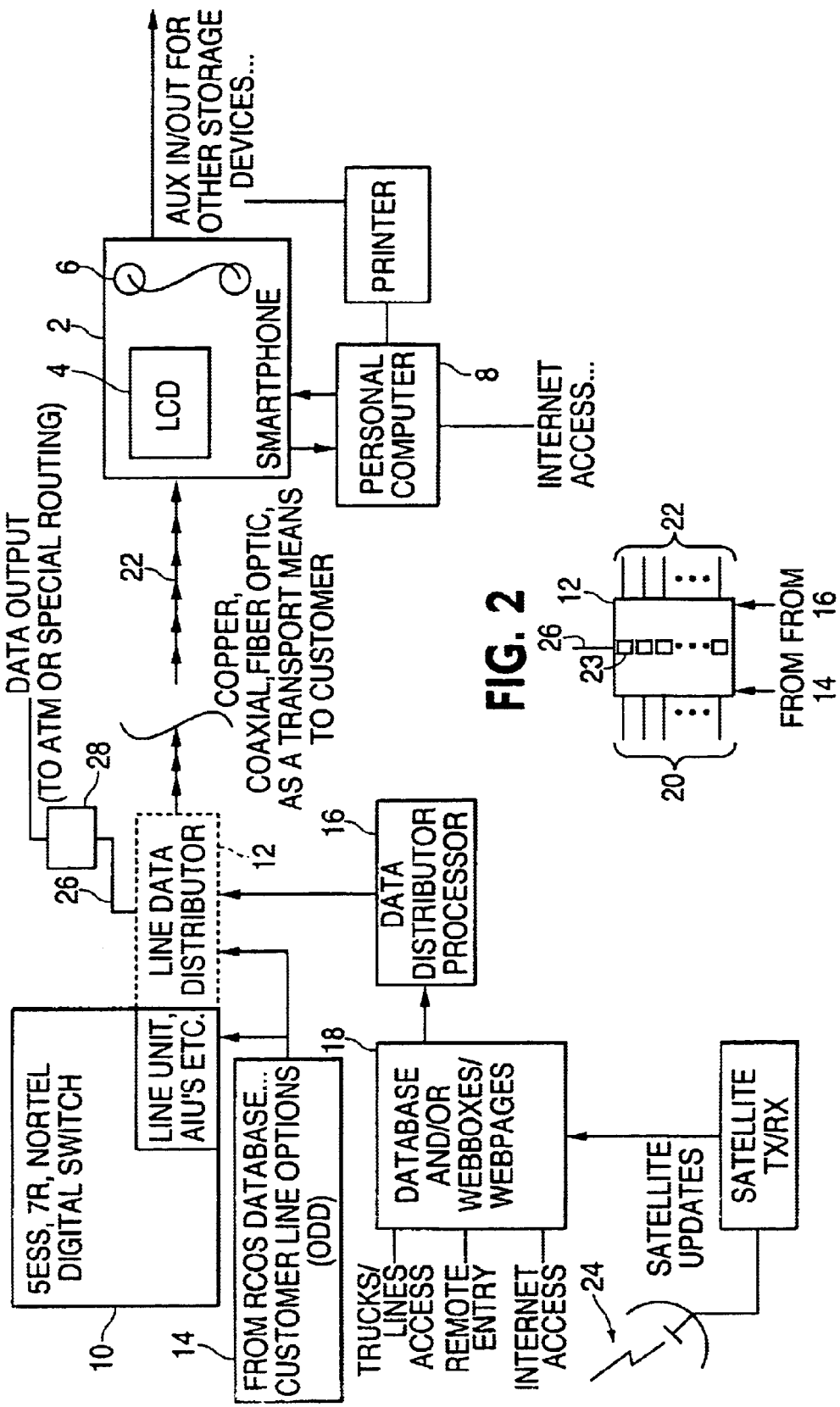

TELEPHONE AND SYSTEM FOR DIRECT DELIVERY OF INFORMATION

CROSS REFERENCE TO RELATED APPLICATIONS

This application is a continuation in part of PCT/US00/06701 filed on May 5, 2000 and claims the benefit of U.S. Provisional Application 60/132,570 filed on May 5, 1999.

TECHNICAL FIELD

This invention relates to the art of telephones. In particular, the invention relates to a programmable telephone having memory and display features and also to a data distribution system for use with such a telephone to connect a database directly to a large number of telephones simultaneously.

BACKGROUND ART

The ordinary telephone in general use, commonly termed a POT (plain old telephone) comprises a hand set and a keypad and may contain a display for visually displaying phone numbers, date and time, caller ID, etc. Such telephones are connected to other telephones through a network including hard wires and wireless links whereby users talk to other users directly or leave messages.

Computers that can be connected to the telephone system are also in widespread use, the communications link often being a modem and associated programming that connect the computer to other computers via the Internet through the services of an Internet Service Provider (ISP).

Both of these systems require connections to be made by an interfacing unit in the local telephone exchange. Thus, all present telephone calls and computer connections to the Internet pass through a local telephone exchange, which means that each connection must at some point include a telephone number and be individually dialed before the connection can be made. This requirement places a severe restriction on the ability to communicate with a large number of telephones and easy access to the Internet.

SUMMARY OF THE INVENTION

In accordance with one aspect of the invention, a new, more versatile telephone includes a microprocessor that provides the telephone with many of the features of a computer and allows a wide variety of communication services to be supplied directly to the telephone through existing telephone lines. Thus, the telephone of the invention includes a handset and keypad, as are known in the art, and further includes a visual display and processor unit that is programmed to allow a wide range of services to be provided directly through the telephone and for information to be visually displayed. Further, the telephone of the invention can be a stand-alone or it can be operatively connected with a computer to cooperate therewith.

One feature that can be included with the new telephone is a memory element that contains a long-distance access code for accessing a particular long-distance provider and is capable of recalling the code when a user places a long-distance call. The memory is capable of being programmed to allow one or more new access codes to be stored in the memory in place of initial codes. Thus, the user can modify the long-distance code whenever he desires to change the long-distance service.

The new telephone is also capable of accepting the access code memory-reprogramming data from a variety of external sources. For example, while it is possible to reprogram the access codes through the telephone's keypad, it is preferable that the telephone be provided with a reprogramming connection through a telephone or other line connected directly to a remote site, such as the Internet, or to a computer connected to the remote site.

In accordance with a preferred embodiment of the invention, a telephone console is provided with a programmable electronic memory for providing long-distance access codes when a user places a long-distance call. Thus, the telephone provides the tone signals necessary to transmit the access codes to the local telephone company's switches to connect the user's telephone to the specified carrier. The memory device that records the long-distance codes may be a microprocessor that is known in the art.

In another embodiment, the user's telephone is electronically connected to a computer to allow communication or data signals received by the computer to be supplied to the telephone. This can be done in a variety of ways, for example, by connecting telephone inputs to the serial or parallel outputs of the computer. As well, a separate data output may be provided for the computer. In one embodiment, the computer may be connected to the Internet by modem or otherwise, and the connection between the computer and the telephone will allow data received by the computer, as by downloading from the Internet, to be transmitted to the telephone.

One method for operating the telephone system of the invention to change long-distance access codes is for a website provider to contract with the various long-distance providers for a set of services and to advertise those services by way of an Internet website. For example, the website would contain a listing of long distance services for various service parameters, and the telephone subscriber would review those available services. Such a listing of services may, for example, contain the names of long-distance providers that would provide the lowest cost service for a given set of parameters, e.g., average length of call or geographic zones. Preferably, these services have been negotiated by the website provider such that they are economically attractive to the users.

The website has embedded in it the access codes for the various long-distance services. In operation, the user selects a particular long distance provider according to the user's characteristics and then directs his computer to download the access codes, which have been provided by the long-distance carriers. Thus, the user may be asked to "double-click" on the icon for a particular long-distance provider to cause the website computer to download the particular access codes to the user's telephone or computer. These access codes could then be printed out for manual entry into the telephone, loaded directly into the telephone of the invention, or the user's computer may output the codes through the line connected to the telephone to automatically program access codes to the new long-distance provider.

Other codes can be provided as well, such as alternative codes to use when the primary circuits are full.

The user can connect with the long-distance provider by activating the access code, as by pressing a selected button on the telephone that causes the microprocessor to generate the necessary codes. When the connection with the long-distance provider is made, the user enters the desired telephone number in the usual fashion.

The telephone includes other features. For example, many telephones have visual displays (e.g., liquid crystal displays), and the telephone of the invention utilizes the LCD to display other information, including advertising, news, etc. Data representing these messages will be included with the data supplied from a database, downloaded from a website, or from other sources and transmitted when the user is using the telephone or when the telephone is not active as will be described. The messages can be updated automatically or by connecting with the website and downloading new messages.

The telephone of the invention can be portable or a portable computer can be connected to the telephone line. This allows the user to take the telephone or computer having the downloaded information for use at remote sites. For example, if the downloaded information is the newspaper, or section thereof, the user can take the telephone or computer and read the information at the office or on the bus or subway. In a contemplated use, the user subscribes to the sports sections of several newspapers. These sections are stored in the database and downloaded into the user's smart telephone when telephone traffic is light, such as at midnight, whereby the information is available for use in the morning.

Another contemplated use is for advertisers to supply webpages to the database for downloading into a subscriber's smart telephone or computer. The webpage could have coupons or other information that the advertiser could change daily by electronically transmitting a new webpage to the database.

In accordance with a further aspect of the invention, the digital switch of a public telephone exchange is provided with a line data distributor that allows selective connection directly between customer telephone lines and an input from a data distributor. The data distributor may include inputs from a database, the Internet, or the like for transmission of data as described above. This direct connection allows the information to be transmitted to the customer lines without passing through the normal switching process, obviating the necessity of dialing the telephone number for each of the subscribers.

The line data distributor of the invention preferably comprises a plurality of software controlled electronic switches and splitters, each switch being capable of receiving a respective customer output line from the telephone exchange as an input and connecting that line to the respective customer's telephone line. The switch controls the connection between the telephone exchange and the customer line such that each respective customer's telephone line is connected to a respective output of the local exchange or is connected to a data input line, which allows data to be directly supplied to the plurality of customer's lines without passing through the public exchange. The line data distributor also includes an input from a data distributor processor for supplying data from the data distributor processor, including information such as advertising, electronic newspapers, and the like.

The line data distributor can accept/retrieve information from a database and periodically send such data to selected customers lines. This information can be sent without "ringing" the telephone whereby it is displayed directly on the telephone display or stored in the processor memory of the telephone for later display. The information may include such items as the newspaper, newsletters, electronic junk mail, special coupons, weather reports and alerts, etc.

Thus, the line data distributor provides a means to connect lines directly to a common data bus without dialing or switching to a particular line. The line data distributor is an electronic switch that is controlled by software stored in an external database. The software allows or denies data delivery to selected customers'telephones via a common access. Several line data distributors can be strategically placed in the electronic switches of the telephone exchanges downstream of concentrator points to allow data to be delivered from a single source quickly and efficiently without having to dial each line separately and without using valuable switch time slots or packets.

The line data distributor may be external to the telephone exchange switch or internal. Preferably the switch is part of a user's AIU, line card, or remote concentrator line card. It will be appreciated that the line data distributor is preferably located beyond the concentration units so that each switch is associated a respective individual customer line. This arrangement allows simultaneous access to all of the customers.

Thus, the invention provides flash delivery of data to a large number of customers without dialing each number. The line data distributor may employ software similar to that used to specify "recent change profiles" in a telephone exchange by specifying which customer is to be provided with which one of several services that are provided, e.g., advertisements, weather alerts, newspapers, etc.

A recent change database preferably controls the switches in accordance with information regarding whether a telephone customer has subscribed to any of the data services. For example, in one embodiment the recent change order has inputs regarding whether a subscriber has elected to receive a newspaper, advertisements, or the like. Also, the recent change database can be programmed with profile data. In accordance with this feature, demographic, economic, and other characteristics of the telephone user would be provided to the recent change database in the form of a code that operates to control the switches. This information could also be arranged to correlate with a header on the data itself to open or close an individual switch for particular data delivery.

While the line data distributor may generally pass normal calls directly through for normal processing, it can also route calls electronically directly to a multiplexer/converter. The output ATM packets are addressed and routed to the correct ISP for high speed Internet access.

BRIEF DESCRIPTION OF THE DRAWINGS

FIG. 1 is an overall schematic illustrating a system in accordance with the invention.

FIG. 2 is a schematic of a line data distributor in accordance with the invention.

DETAILED DESCRIPTION OF THE PREFERRED EMBODIMENTS

With reference to FIG. 1, a system in accordance with the invention includes a telephone set 2 having an LCD display 4 and a handset 6. The telephone also includes a microprocessor (not shown) for controlling the operation of the telephone to provide such features as an answering machine; cordless/standard phone operation; and a color, liquid-crystal view panel. The telephone allows data communication and downloading of data from the telephone line as well as directly from the Internet, including long-distance carrier access digits, weather data, advertisements, etc. Further features include:

Event reminders can be programmed in the main software to flash on display reminding the user of special occasions and appointments, etc.

A Rolodex-type capability to store names and telephone numbers in a database for dialing, printing mailing list from main CPU.

A display of the precise time can be obtained by connecting the display to a service providing such information.

Use as a two-way radio, base to phone, or phone-to-phone with a second cordless phone.

Detailed personal information is stored in the telephone and delivered automatically when a 911 call is made. Such information is then automatically available and can be relayed to the emergency vehicle to provide valuable information and save time in an emergency.

Two telephone line inputs, one for direct to telephone company facilities and a second to a computer 8 to allow integration with the computer.

While only one customer's telephone 2 is shown in FIG. 1, it will be appreciated that the telephone system of the invention includes a large number of such telephones. In accordance with the invention, a line data distributor 12 connects these telephones to a public telephone exchange 10.

FIG. 2 illustrates the line data distributor 12. The output lines 20 from the public exchange are connected as inputs to the line data distributor. Each of the lines 20 corresponds to a customer's line, and the outputs 22 of the line data distributor are connected to the customer's (subscriber's) lines. The line data distributor provides a series of electronic switches 23, which are preferably integrated circuits, and splitters that are software controlled by the data from the recent change database 14 and control connection of the customer lines 22 to the exchange lines 20 or the data from the data distributor processor.

The line data distributor 12 receives control information from a recent change database 14. This database includes information that controls the services to be provided to each of the customers, such as delivery of advertisements, newspapers etc.

The line data distributor also provides an output 26 that may include a multiplexer/demultiplexer 28 for allowing a number of separate calls to be converted to ATM and addressed for transmission to the correct ISP or PVC pipe.

The line data distributor 12 receives data inputs from a data distributor processor 16. This processor receives data for distribution from a source of data 18, which may include a database, a connection to or data from the Internet, a connection to or data from a satellite receiver 24, and the like.

The database may, for example, include data similar to web pages that are provided by advertisers. Thus, these pages are stored in the database 18 for delivery to the telephones 2 via the line data distributor 12. The pages can be loaded into the database in any convenient manner, including transmission from other databases over other telephone lines, a connection to the Internet, diskettes, etc. Thus, the advertiser can develop a "web page" or other advertisement, including coupons and the like for delivery to the customers' telephones 2, which have the processor and displays as described above and can update the page as necessary via any of several existing data links.

Thus, the telephone system integrates the telephone network and the Internet whereby customers can access Internet web pages through the telephone system via the data distributor processor 16 and the line data distributor. This allows customers to receive data with the press of a touch-tone pad.

As well, customers can communicate through the system by way of the output line 26 and the multiplex 28 through ATM or special routing.

In operation, the RCOS database is programmed to control the switches 23 based on previous selections by customers. If a customer has elected to receive information to be provided by the operator of the database, the appropriate switch 23 will be controlled to transmit data from the database processor 16 to that customer's line at the appropriate time. The control 14 will be coordinated with the data distributor processor 16 so that the customer need not elect to receive all or none of the data. The election may include only part of the data by coordinating the control of the switch with the transmission of the data.

In those instances where a customer's line is busy when the data is to be distributed, the recent change database controller 14 and the data distributor processor will cause a second attempt to be made to all lines that were busy on the first attempt. After a predetermined number of tries, the customer will be informed of the need to dial the database directly to receive the information.

The line data distributor of the invention may be part of a retrofit of existing telephone systems or may be incorporated into new switches, e.g., packet switches.

Modifications within the scope of the appended claims will be apparent to those of skill in the art.

I claim:

1. In a telephone system of the type having a telephone exchange switch for directing telephone calls to a selected one of a plurality of customer telephone lines, the improvement comprising a line data distributor having a plurality of input lines each of which is connected between a respective one of said customer telephone lines of the telephone exchange switch said line date distributor having a data input and operating to direct data from the data input simultaneously and directly to a plurality of said customer telephone lines.

2. A telephone system according to claim 1 wherein said line data distributor includes a control input for receiving control signals defining each one of said plurality of said customer telephone lines.

3. A telephone system according to claim 2 wherein said line data distributor further comprises a data output connected to said customer telephone lines.

4. A telephone system according to claim 3 wherein said data output further comprises a multiplexer.

5. A telephone system according to claim 1 further comprising a database connected to said data input.

6. A telephone system according to claim 5 wherein said database has stored therein visual or textual information.

7. A telephone system according to claim 1 wherein the improvement further comprises a customer telephone capable of receiving and processing data and including a visual display for displaying said data.

8. A line data distributor for distributing data to a plurality of telephone lines simultaneously comprising a plurality of controllable switches, a plurality of input lines, each of which is connected to a respective one of said plurality of controllable switches, a plurality of output lines, each of which is connected to a respective one of said plurality of controllable switches, a data input connected to each of said output lines through a respective one of said plurality of controllable switches, and means for controlling said controllable switches such that data on said data input line is distributed simultaneously to selected ones of said output lines, wherein said input lines are configured to be attached to telephone output lines and said output lines are configured to be connected to said telephone lines.

9. A line data distributor according to claim 8 wherein said means for controlling said switches includes a database containing service selection made by customers.

10. A line data distributor according to claim 8 in combination with a data distributor processor that provides data to said data input line.

11. In combination, a telephone switch and a line data distributor, wherein said line data distributor comprises a plurality of controllable switches, a plurality of input lines, each of which is connected to a respective one of said controllable switches, a plurality of output line, each of which is connected to a respective said controllable switches, a data input connected to each of said output lines through a respective one of said controllable switches, and means for controlling said controllable switches such that data on said data input line is simultaneously distributed to selected ones of said output lines, and wherein each of said input lines is attached to a respective output line of said telephone switch and each of said output lines is connected to a respective customer telephone line.

\* \* \* \* \*

UNITED STATES PATENT AND TRADEMARK OFFICE
CERTIFICATE OF CORRECTION

PATENT NO. : 6,882,710 B2
DATED : April 19, 2005
INVENTOR(S) : George B. Strickland It is certified that error appears in the above-identified patent and that said Letters Patent is hereby corrected as shown below:

<u>Title page,</u>
Item [75], Inventor, "George G. Strickland, 6423 Babour Lake, Rd., Fayetteville, NC 28302" should read -- George B. Strickland, 6423 Barbour Lake Rd., Fayetteville, NC 28306 --

Signed and Sealed this

Ninth Day of August, 2005

JON W. DUDAS
*Director of the United States Patent and Trademark Office*